(12) United States Patent  (10) Patent No.: US 8,473,498 B2
Anderson  (45) Date of Patent: Jun. 25, 2013

(54) NATURAL LANGUAGE TEXT ANALYTICS

(76) Inventor: Tom H. C. Anderson, Stamford, CT (US)

( * ) Notice: Subject to any disclaimer, the term of this patent is extended or adjusted under 35 U.S.C. 154(b) by 0 days.

(21) Appl. No.: 13/196,426

(22) Filed: Aug. 2, 2011

(65) Prior Publication Data

US 2013/0036126 A1  Feb. 7, 2013

(51) Int. Cl.
G06F 17/30 (2006.01)

(52) U.S. Cl.
USPC ............ 707/748; 707/749; 707/750; 707/754

(58) Field of Classification Search
USPC .......................................... 707/748–750, 754
See application file for complete search history.

(56) References Cited

U.S. PATENT DOCUMENTS

| 6,078,737 | A | 6/2000 | Suzuki | |
| 6,772,196 | B1* | 8/2004 | Kirsch et al. | 709/206 |
| 7,076,527 | B2 | 7/2006 | Bellegarda et al. | |
| 7,890,514 | B1* | 2/2011 | Mohan et al. | 707/748 |
| 8,041,669 | B2 | 10/2011 | Nigam et al. | |
| 8,060,506 | B1* | 11/2011 | Chang et al. | 707/729 |
| 8,180,717 | B2 | 5/2012 | King et al. | |
| 2003/0204382 | A1* | 10/2003 | Julier et al. | 702/196 |
| 2004/0236729 | A1* | 11/2004 | Dingledine et al. | 707/3 |
| 2005/0198026 | A1* | 9/2005 | Dehlinger et al. | 707/5 |
| 2006/0206574 | A1* | 9/2006 | Bellegarda et al. | 709/206 |
| 2008/0313130 | A1 | 12/2008 | Hammond et al. | |
| 2009/0306967 | A1 | 12/2009 | Nicolov et al. | |
| 2010/0119053 | A1 | 5/2010 | Goeldi | |
| 2011/0014969 | A1* | 1/2011 | Nicely | 463/21 |
| 2011/0099133 | A1 | 4/2011 | Chang et al. | |
| 2011/0184944 | A1* | 7/2011 | Kenedy et al. | 707/723 |

OTHER PUBLICATIONS

Hopkins, et al., "A Method of Automated Nonparametric Content Analysis for Social Science", American Journal of Political Science, (Jan. 2010), vol. 54(1), pp. 229-247.
International Search Report and Written Opinion dated Oct. 16, 2012 from corresponding International Patent Application No. PCT/US12/048969, 11 pages.

* cited by examiner

Primary Examiner — Hanh Thai
(74) Attorney, Agent, or Firm — Ohlandt, Greeley, Ruggiero & Perle, L.L.P.

(57) ABSTRACT

A method of text analytics includes filtering a plurality of unfiltered records having unstructured data into at least a first group and a second group. The first group and said second group each include at least two records and the first group is different than the second group. The method includes determining a first proportion of occurrence for a term by comparing a first number of records having at least one occurrence of the term in the first group to a first total number of records in the first group, determining a second proportion of occurrence for the term by comparing a second number of records having at least one occurrence of the term in said second group to a second total number of records in the second group, and comparing the first proportion of occurrence to the second proportion of occurrence to yield a resultant comparison occurrence.

10 Claims, 4 Drawing Sheets

TERM TABLE 200

| TERM | GROUP A | GROUP B |
|---|---|---|
| TERM 1 | 1% | 2% |
| TERM 2 | 23% | 25% |
| TERM 3 | 25% | 67% |
| ... | ... | ... |
| TERM 500 | 0% | 1% |

FIG. 2

NATURAL LANGUAGE TEXT ANALYTICS

BACKGROUND OF THE DISCLOSURE

1. Field of the Disclosure

The present disclosure relates to the field of text analytics. More particularly, the present disclosure relates to a method and system for natural language processing and monitoring within groups of unstructured data, i.e. text data.

2. Description of the Related Art

According to the Butler Group, approximately 85% of all information is text data stored in an "unstructured" format. Further, according to the Gartner Group, over 7 million web pages having additional text data are added every day. In addition, other steams of data such as social networking sites, e.g., Facebook and Twitter, offer an ever-increasing amount of unstructured text data each day.

Analyzing this unstructured data is of particular interest to the field of text analytics. The unstructured data provides unparalleled data sources for analysis such as feedback on a particular product or service, an area of interest for a particular community, or predicting trends according to opinion sentiment representative of a particular community.

Conventional techniques to analyze data are directed at analysis of data within a record, e.g., a file. Such techniques identify a subject of interest and also related key terms, e.g., verbs or adjectives, to predict and provide an overall sentiment, e.g., positive or negative, of the subject of interest.

Additional techniques offer a simplistic approach and require user input to create a Boolean search, i.e., search for and count presence of "X AND Y NOT Z".

All of the above-mentioned techniques suffer from a narrowly defined set of rules. That is, each of the above-mentioned techniques search data within a single set of data, e.g., a comment, a sentence, a paragraph, or a document (referred to as file or record), but, ultimately, each technique fails to analyze the context of the data such as relative context provided by comparison amongst different groups of records.

In addition, the above-mentioned technique of a Boolean search requires a user to input a term or terms of interest. In instances of a new, or an un-encountered slang expression, the user will overlook and fail to analyze the significance of slang term occurrence. Moreover, a user may overlook an occurrence of a known term or terms if the user fails to contemplate such term or terms at the time of analysis.

Accordingly, there is a need for a system and method for text analytics that overcomes, alleviates, and/or mitigates one or more of the aforementioned and other deleterious effects of prior art.

SUMMARY OF THE DISCLOSURE

The present disclosure provides a method and system of text analytics that identifies, analyzes, and compares a term or terms of data within one or more groups of data.

The present disclosure also provides a method and/or a system of text analytics to analyze a term or terms including, but not limited to, any arrangement of alphanumeric characters and/or symbols such that slang or jargon are analyzed.

The present disclosure further provides a term statistical comparison to overcome instances where a user may overlook a known term or terms. The statistical comparison may be utilized, via adjustment of confidence levels, to draw attention to terms or combination of terms that are significantly different amongst the groups and filter out terms that occur in the same proportion among the groups of text.

The present disclosure also provides a method of text analytics. The method includes filtering a plurality of unfiltered records having unstructured data according to at least one criterion into at least a first group and a second group. The first group and the second group each comprise at least two records and the first group is different than the second group. The method further provides for determining a first proportion of occurrence of a term by comparing a first number of records having at least one occurrence of the term in the first group to a first total number records in the first group, determining a second proportion of occurrence of the term by comparing a second number of records having at least one occurrence of the term in the second group to a second total number records in the second group, comparing the first proportion of occurrence to the second proportion of occurrence to yield a resultant comparison occurrence, and dispatching the resultant comparison occurrence.

The present disclosure also provides a system of text analytics. The system includes a processor and a memory. The memory has instructions that are readable by the processor and cause the processor to filter a plurality of unfiltered records having unstructured data according to at least one criterion into at least a first group and a second group, the first group and the second group each comprise at least two records, wherein the first group is different than the second group. The instructions further cause the processor to determine a first proportion of occurrence of a term by comparing a first number of records having at least one occurrence of the term in the first group to a first total number records in the first group. In addition, the instructions cause the processor to determine a second proportion of occurrence of the term by comparing a second number of records having at least one occurrence of the term in the second group to a second total number records in the second group, compare the first proportion of occurrence to the second proportion of occurrence to yield a resultant comparison occurrence, and dispatch the resultant comparison occurrence.

The present disclosure further provides that the above-discussed memory can be a non-transitory storage medium.

The present disclosure further provides a method of text analytics that includes allocate each record of a plurality of records a numerical value according to a sentiment to yield a plurality of sentiment records, filtering the plurality of sentiment records according to a criterion to yield filtered records, determining a mean numerical value for the filtered records to yield a sentiment mean value, and dispatching the sentiment mean value.

The present disclosure also provides a non-transitory storage medium that includes instructions that are readable by a processor and cause the processor to allocate each record of a plurality of records a numerical value according to a sentiment to yield a plurality of sentiment records, filter the plurality of sentiment records according to a criterion to yield filtered records, determine a sentiment value for a term according to a number of the filtered records having the term and the numerical value, wherein the sentiment value is selected from the group of a mean, a variance and a standard deviation, and dispatch the sentiment value.

The above-described and other features and advantages of the present disclosure will be appreciated and understood by those skilled in the art from the following detailed description, drawings, and appended claims.

BRIEF DESCRIPTION OF THE DRAWINGS

FIG. 2 is a Term Table that illustrates the frequency of occurrence of terms according to groups of data.

A component or a feature that is common to more than one drawing is indicated with the same reference number in each of the drawings.

DETAILED DESCRIPTION OF THE DISCLOSURE

Figure 1:
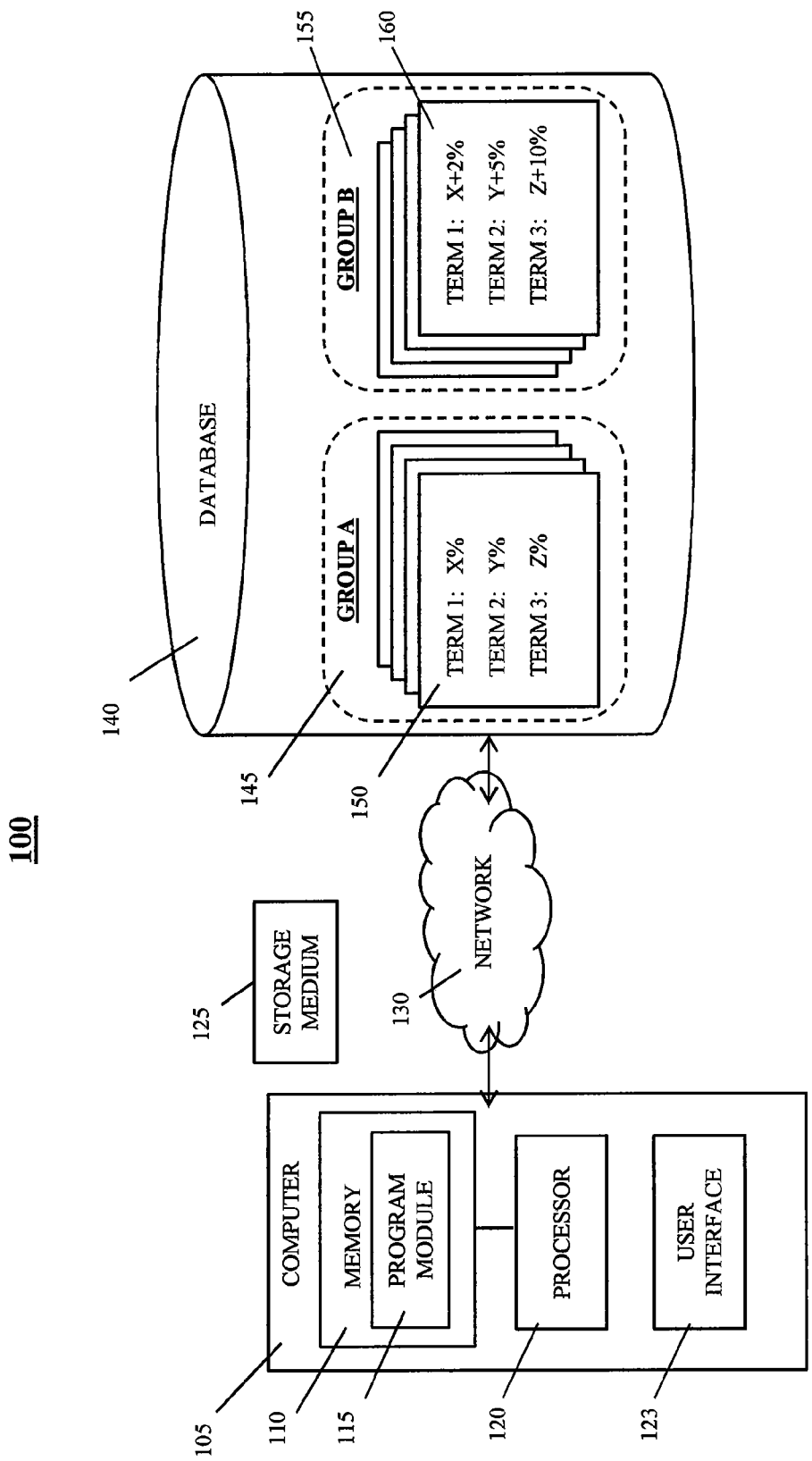
FIG. 1 illustrates a system of natural language processing, within groups of unstructured data, according to the present disclosure.

Referring to the figures, and, in particular, to FIG. 1, a system of text analytics within groups of unstructured data is generally represented by reference numeral 100. System 100 illustrates a system that compares data, e.g., terms in documents, from two different groups of data. System 100 includes a computer 105 connected to a network 130, e.g., the Internet, a storage medium 125, and a database 140 also connected to network 130.

Database 140 includes data sorted into a Group A including filtered records 150 and Group B comprising filtered records 160. The terms "records", "documents", and "files" can be used interchangeably. The data in database 140 may be electronic data such as, but not limited to: meta-data, call center transcript data, email data, website data, survey data, blog or microblog data, social media data, e.g., Facebook and LinkedIn.

Figure 3:
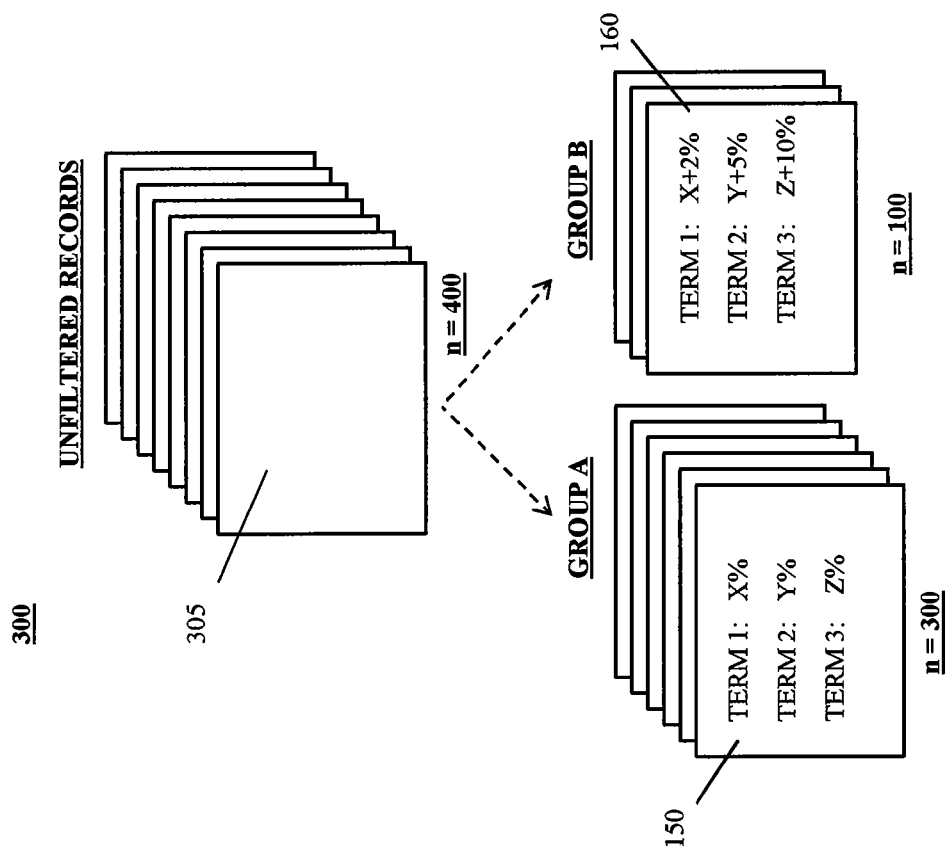
FIG. 3 illustrates a filtering process of unstructured data.

Typically, filtered records 150 and filtered records 160 are sorted or filtered from a larger group of unfiltered records (see FIG. 3, unfiltered records 305). System 100 illustrates a result of filtering the unfiltered records into two groups, i.e., Group A and Group B, according to desired comparison criteria.

For example, records in Group A and Group B may represent males vs. females, Brand A vs. Brand B, this month's data vs. last month's data, or this month's data vs. a yearly aggregation, i.e., filtered records 150 of Group A may be a subset of filtered records 160 within Group B. Put differently, Group A and Group B are vehicles by which terms, or a combination of terms, are compared across groups of unstructured data, e.g., text data. In addition, the unfiltered records may be filtered into any number of groups, e.g., Group C, Group D, and so on.

Computer 105 has a memory 110, a program module 115, a user interface 123, and a processor 120. Although computer 105 is represented herein as a standalone device, it is not limited to such, but instead can be connected or coupled to other devices (not shown) in a distributed processing system.

User interface 123 includes an input device, such as a keyboard or speech recognition subsystem, for enabling a user to communicate information and command selections to processor 120. User interface 123 also has an output device such as a display or a printer. A cursor control, such as a mouse, track-ball, or joy stick, allows the user to manipulate a cursor on the display for communicating additional information and command selections to processor 120.

Memory 110 is a computer-readable medium encoded with a computer program. In this regard, memory 110 stores data and instructions that are readable and executable by processor 120 for controlling the operation of the processor. Memory 110 may be implemented in a random access memory (RAM), a hard drive, a read only memory (ROM), or a combination thereof. One component of memory 110 is a program module 115.

Program module 115 has instructions for controlling processor 120 to execute the methods described herein. For example, under control of program module 115, processor 120 filters a plurality of records having unstructured data into at least a first group, i.e., Group A, and a second group, i.e., Group B. Group B may be a stand-alone group, or, alternatively, Group B may be a subgroup of Group A. Each of Group A and Group B include at least one record. However, preferably, each of Group A and Group B each include at least two records.

Processor 120, under control of program module 115, calculates a first proportion of occurrence of a term in the unstructured data of the at least two records of the first group by comparing a first number of records having at least one occurrence of the term in the first group to a first total number of records in the first group. Processor further determines a second proportion of occurrence of the term in the unstructured data of the at least two records of the second group by comparing a second number of records having at least one occurrence of the term in the second group to a second total number records in the second group. Processor 120 further performs a comparison of the first proportion of occurrence and the second proportion of occurrence, to yield a resultant comparison occurrence, e.g., a resultant occurrence of Term 1, 2, 3 of Group A in relation to Term 1, 2, 3 of Group B. In addition, processor 120 dispatches the resultant comparison occurrence to user interface 123. The proportions, e.g., the first proportion and the second proportion, are calculated by calculating a number of records having at least one occurrence of the term divided by the total number of records within the group of records. For example, for a group of ten records, with three records having at least one occurrence of the term, a proportion of 33% results, i.e., 3/10. Accordingly, system 100 calculates the total number of records having at least one occurrence of the terms, the number of records within the group, and the proportion of occurrence of the specific term.

In addition, processor 120 under control of program module 115, can allocate each record of a plurality of records a numerical value according to a sentiment to yield a plurality of sentiment records, filter the plurality of sentiment records according to a criterion to yield filtered records, determine a sentiment value for a term according to a number of said filtered records having said term and the numerical value and dispatch the sentiment value. The sentiment value can include a mean, a variance or a deviation.

The term "module" is used herein to denote a functional operation that may be embodied either as a stand-alone component or as an integrated configuration of a plurality of sub-ordinate components. Thus, program module 115 may be implemented as a single module or as a plurality of modules that operate in cooperation with one another. Moreover, although program module 115 is described herein as being installed in memory 110, and therefore being implemented in software, it could be implemented in any of hardware (e.g., electronic circuitry), firmware, software, or a combination thereof.

Although system 100 is described herein as having the instructions for the method of the present disclosure installed into memory 110, the instructions can be tangibly embodied on an external computer-readable storage medium 125 for subsequent loading into memory 220. Storage medium 125 can be any conventional storage medium, including, but not limited to, a floppy disk, a compact disk, a magnetic tape, a read only memory, an optical storage medium, a universal serial bus (USB) flash drive, a digital versatile disc, or a zip drive. The instructions could also be embodied in a random access memory, or other type of electronic storage, located on a remote storage system and connected or coupled to computer 105, via network 130.

Preferably, system 100 does not identify terms a-priori at a single comment, sentence, or even a single record level. Instead, system 100 identifies the presence of, or lack thereof, statistically significant differences between terms in two or more groups of records. Identifying resultant occurrences of terms across two or more groups of records requires "terms of interest".

System 100 monitors changes in any term or terms, including an appearance of a completely new and hitherto unknown term or terms. For example, slang or technical jargon, e.g., "LOL", "#FF", "Bballer", are analyzed amongst unstructured data of two or more groups. That is, system 100, operates without any required "term of interest", but rather, performs a term by term comparison of all terms within unstructured data within two or more groups, or between one group and a subgroup. Accordingly, system 100 can further perform a comparison of foreign language terms. In addition, system 100 can perform a comparison of combinations of two or more terms appearing next to each other (separated by a space) in the records.

For example, if terms of Group A and Group B are compared, and if Group B contains a term that has never been used before, i.e., "explosion", system 100 will still calculate the number of occurrences of the term "explosion". In this fashion, system 100 identifies and analyzes instances of completely new and hitherto unknown terms between at least two groups of records.

Further, system 100 can incorporate a Boolean type of search that allows a user (not shown) to input terms, or combinations of terms, of interest. For example, these terms may be a positive or negative term together with a specific concept, e.g., "shipping" and "late", or "Shipping" and "on-time". The positive or negative term or terms is related to a sentiment value of further embodiments, discussed in greater detail below.

Computer 105 receives input of the Boolean search including a term or terms of interest, via user interface 123, and then determines the proportion of the term or terms in the unstructured data of the records of Group A by comparing the number of records having at least one occurrence of the term to the total number of records in Group A. Likewise, computer 105 determines the proportion of the term or terms in the unstructured data of the records of Group B by comparing a number of records having at least one occurrence of the term or terms in Group B to the total number records in Group B. Computer 105 then performs a comparison of the proportion of term or terms between Group A and Group B to yield a resultant comparison occurrence.

In addition, when processor 120 determines the first or second proportion of occurrence for a term or terms, processor 120 may exclude "stop terms". Stop terms are defined as simple parts of speech such as articles; "a", "an", "and", and "the". Excluding stop terms decreases and reduces processing of undesirable and/or insignificant terms. This leads to an overall reduction in "noise" of a resultant occurrence.

Further still, processing can be expedited when processor 120 determines the first or second proportion of occurrence for a term or terms by requiring a minimum number of characters for the term. For example, processor 120 may require that the term or terms have at least three (3) or more characters.

Typically, processor 120 determines the proportion of occurrence for all of the terms within a group of records. To assist in providing relevant data to a user, processor 120 may only return the top terms. For example, processor 120 may only return the top 500 terms contained within the records of the group.

Further, processor 120 can calculate a standard of error, i.e., a margin of error, for the proportion of terms determined for Group A and Group B. That is, processor 120, determines a risk of error introduced by a given sample size according to a confidence level for the first proportion of occurrence of a term for Group A and the second proportion of occurrence of a term for Group B.

In particular, the equation for calculating margin of error at the 95% confidence level is as follows:

$$s = \sqrt{\frac{p \times (100-p)}{n}} \times 1.96$$

s=standard error (margin of error)
p=penetration percentage (as used herein, this is the proportion of occurrence for a term)
n=sample size
1.96=constant value to translate the margin of error to the 95% confidence level (most market research is based on)

In particular, the standard error provides a range, e.g., +/−10%, for the proportion of occurrence of the term in Group A and Group B and accounts for the sample size, e.g., the number of records contained within Group A or Group B. This range is combined with the underlying proportion of occurrence of the term to yield a standard error range, e.g., 45%+/−10%.

The confidence level, e.g., 1.96, is a configurable metric that illustrates a level of confidence by which the standard error is accurate. The standard of error is decreased or increased according to the level of confidence. That is, if the level of confidence is decreased to 80% from 95%, the standard of error likewise will decreased.

Typically, the confidence level is calculated using Pearson's chi-square test. Pearson's chi-square test tests a null hypothesis of a frequency distribution of certain events observed in a sample consistent with a particular theoretical distribution. Pearson's chi-square test is provided below:

$$X^2 = \sum_{i=1}^{n} \frac{(O_i - E_i)^2}{E_i};$$

Where:
$X^2$=Pearson's cumulative test statistic, which asymptotically approaches a $\chi^2$ distribution.
$O_i$=an observed frequency;
$E_i$=an expected (theoretical) frequency, asserted by the null hypothesis;
n=the number of cells in the table.

The chi-square statistic is calculated by finding the difference between each observed and theoretical frequency for each possible outcome, squaring them, dividing each by the theoretical frequency, and taking the sum of the results.

The standard of error and the confidence level are of particular importance for evaluating smaller sample sizes representative of a larger set of data. For example, social networking sites may provide too much data to be analyzed. Accordingly, a smaller sample set of data, believed to be representative of the larger set of data, is selected for analysis. Selecting the smaller sample set of data introduces a degree of error when comparing a proportion of occurrence of a term in the smaller set of data since a portion of data, i.e., the non-selected data, is not analyzed. This error, while greater than "0", is represented as standard of error. Practitioners will realize system 100 will use the test for statistical significance which is appropriate depending on whether two independent groups or partially overlapping groups are compared, and whether proportions, means or standard deviations are being compared.

Processor 120 uses the standard of error to identify when it is appropriate to discard resultant comparisons of occurrences. That is, terms which occur statistically significantly more or less often can be excluded, or, alternatively, flagged according to a user preference. For instance, an asterisk can be displayed after the returned proportion number to indicate that the proportion is significantly different at the 90% confidence level, while two asterisks indicate that the proportion is significant at the 95% confidence level. Statistical significance is discussed in greater detail below.

As discussed above, the standard of error is combined with the proportion of occurrence to yield the standard error range. When two proportions for a term or terms within Group A and Group B present potentially overlapping ranges, i.e., 45%+/−10% for Group A and 50%+/−5% for Group B, the resultant comparison occurrence can be due to sampling error. That is, the proportions of occurrence of the term overlaps since the proportion of occurrence in Group A ranges between 35% and 55%, while the proportion of occurrence of the term in Group B ranges between 45% and 55%. Thus, the term, according to the standard of error, overlaps between 45% and 55% due to the sample sizes, e.g., the number of records, within Group A and Group B.

For example, assume Group A contains 500 records and Group B has 200 records, each group having unstructured data. If the term "awful" occurs in 1% of the unstructured data of Group A, and the term "awful" occurring in 2% of the unstructured data of Group B, a resulting comparison difference of 1%, e.g., the difference between 2% in Group B and 1% in Group A, would not be statistically significant. This is because at a 95% confidence level the error range for the term in group A is between 0.13% and 1.87% which, in turn, overlaps an error range of the term proportion in group B since the range of Group B is between 0.06% and 3.94%. Accordingly, the 1% comparison difference may be due to a sampling error. On the other hand, if the same proportion of records contained the term "awful", 1% and 2% respectively, but the number of records in Group A and Group B is increased to n=1000 and n=500, respectively, the resultant comparison difference yields that the 1% difference is statistically significant (at an 80% confidence level).

In addition, a larger difference in the proportion of occurrence of the term between Group A and Group B, e.g., 1% and 4%, respectively, would also be identified as significantly different. In fact, this larger difference is also statistically significant at a 95% confidence level. Thus, a user of system 100 can manipulate the confidence level and investigate only terms that occur at statistically significantly higher or lower percentages within the groups being monitored.

Referring to FIG. 2, when processor 120 of system 100 performs the comparison of the proportion of occurrence of terms in Group A to Group B, a term table is created, e.g., Term Table 200. Term Table 200 illustrates a resultant occurrence of terms. In particular, Term Table 200 illustrates a list of terms 1 through 500 with a proportion of occurrence in Group A and Group B indicated by a percentage. For example, in Group A, Term 1 occurred in 1% of the records, and in Group B, Term 1 occurred in 2% of the records. In alternative embodiments, Term Table 200 may simply illustrate a delta, or change in occurrence, between terms of Group A vs. Group B. The user may choose to view only significant differences and, thus, filter out all 'noise' or terms or combination of terms that are occurring equally across groups of interest.

In addition, Term Table 200 can be a repository of terms to efficiently determine the frequency and the proportion of occurrence for the term or terms within the records. In order for system 100 to determine any frequency or proportion of occurrence of a term, a count for each occurrence is increased. In order to increase the count, the term is typically identified and stored. Instead of identifying and storing a term as a "new" term during each comparison, Term Table 200 can be a repository that stores a list of any term previously identified. In this fashion, each time database 140 receives a record, Processor 120 identifies all the terms of the record and updates the listing of terms in Term Table 200. Thus, processor 120 compares identified terms with the list of terms in Term Table 200 and, for each non-listed term, adds the non-listed term to Term Table 200. Term Table 200 can be updated prior to determining the proportion or frequency of occurrence, or, alternatively, Term Table 200 can be updated during the determination.

FIG. 3 is a diagram 300 that illustrates filtering of unstructured data. In particular, diagram 300 illustrates one example of filtering, e.g., sorting, unfiltered records 305 into Group A and Group B. Group A and Group B, as discussed above, each include one or more records, e.g., records 150 and records 160, respectively. A user (not shown) can select or input filtering criteria to system 100. System 100, via processor 120, filters the unfiltered records 305 into two groups, i.e. Group A and Group B, according to filter criteria. As discussed above, the filter criteria may include, but is not limited to: term filters, meta-data, or survey criteria such as a gender, an age, an occupation, and additional criteria such as a time. As illustrated, records 305, n=400, is filtered into Group A, i.e., n=300, and Group B, i.e., n=100. Although the number of records in Group A and Group B, as illustrated, add up to four hundred (400), i.e., the total of unfiltered records 305, the present disclosure contemplates any combination of records filtered into Group A and Group B from unfiltered records 305. For example, Group A can have all four hundred (400) records and Group B can have two (2) records. Accordingly, the two (2) records of Group B are also included in Group A, since Group A has all four hundred records. This type of filtering may be appropriate in situations such as a comparison of data from records according to a time, e.g., data from a particular month vs. a total amount of data (including data from the particular month).

Figure 4:
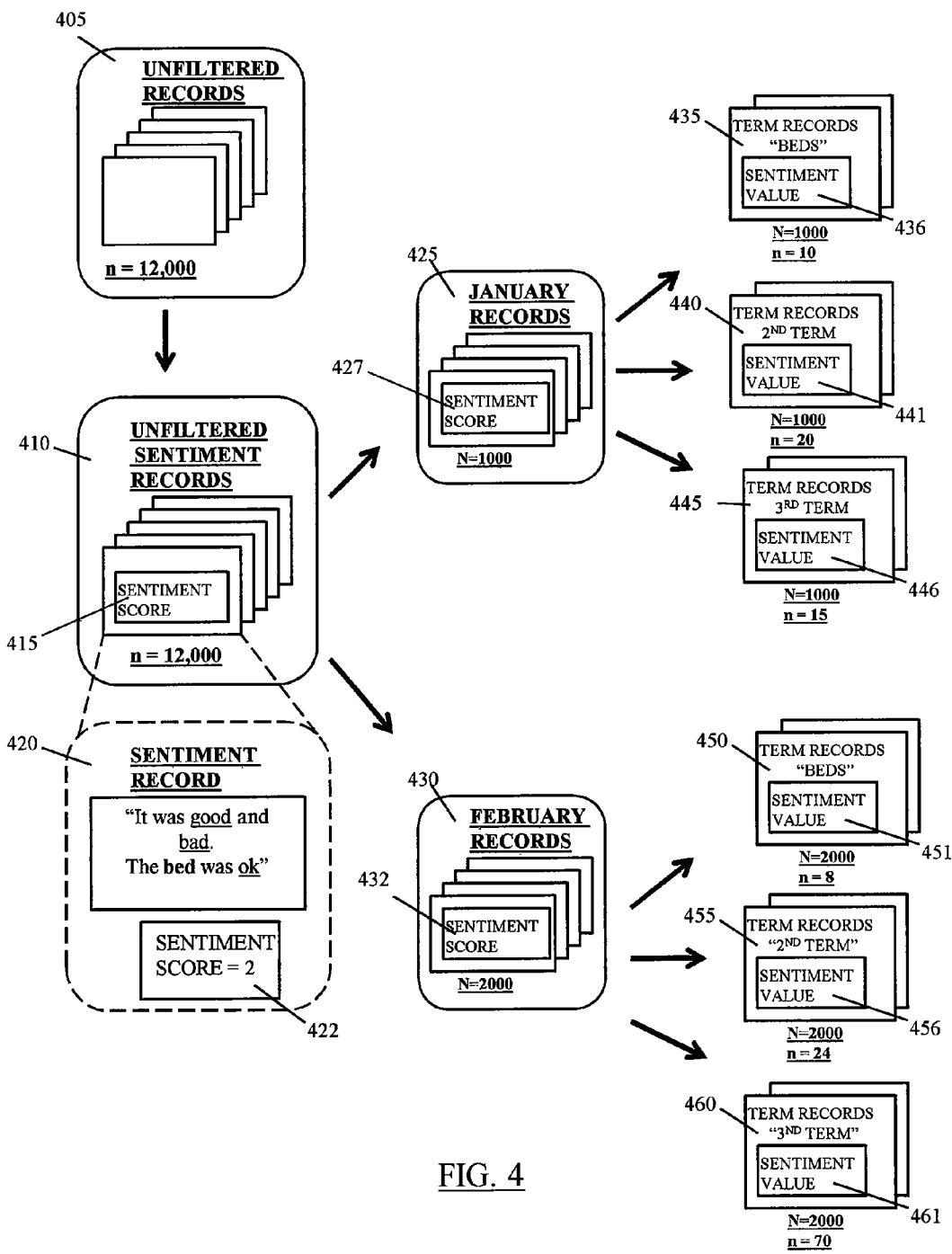
FIG. 4 is a system diagram according to the present disclosure.

FIG. 4 illustrates a system diagram 400 showing unfiltered records 405 being processed to determine sentiment values, e.g., a sentiment mean, a sentiment variance, and a sentiment standard deviation for a term or terms within a group of records.

Sentiment values serve as indicators of process controls that facilitate identification and evaluation of areas, i.e., terms of interest, within a process flow that cause operations outside a sentiment value range.

As used herein, the sentiment value is a numerical value allocated to a record according to the number of occurrences of "descriptive" or "emotional words".

In general, flow diagram 400 is carried out by a processor, e.g., processor 120 of system 100. Each record of unfiltered records 405 is allocated a sentiment score 415 resulting in unfiltered sentiment records 410. Sentiment record 420 is an example of one record of sentiment records 410.

Unfiltered sentiment records 410 can be filtered, e.g., divided, into smaller groups of records according to a criterion. The criterion can include, but is not limited to: a term or terms of interest, a gender, an age, and a time. As illustrated, two criteria, i.e., January and February, are used to filter unfiltered sentiment records 410 into January records 425 and February records 430.

For purposes of discussion, unfiltered records 405 are consumer feedback records for a hotel. Popular terms, e.g., terms that occur with a high rate of occurrence, within January records 425 and February records 430 include "beds, "$2^{nd}$ term," and "$3^{rd}$ term" (and so on for all terms present in the groups).

The processing illustrated by flow diagram 400 can be applied, without limitation, to any unfiltered records, for any term or terms, and for any company or industry. In addition, the terms identified in January records 425 and February records 430 do not necessarily have to be the same. In fact, an underlying sentiment value, i.e., a mean, a variance and a standard deviation, of a term or terms in a first group of records versus a second group of records is especially important when a term value is higher or lower in the first group of records as compared to the second group of records. This sentiment value is discussed in greater detail below.

Processor 120, analyzes each of unfiltered records 405 for "descriptive" or "emotional words" and calculates a sentiment score for each record, i.e., sentiment score 415. Descriptive or emotional words include, but are not limited to: "good", "bad", "great", "terrible", "late", and "early". Typically, the emotional words are pre-defined words, or combinations of words, that are allocated a numerical value according to a sentiment, e.g., negative, neutral or positive.

For example, emotional words such as "bad", or combinations of words such as "not good", are defined as negative words and can be allocated to a numerical value of 1, emotional words such as "OK" or "not bad" are defined as neutral words that can be allocated to a numerical value of to a number 2 and emotional words that such as "good" or "great" are defined as positive words can be allocated to a numerical value of 3. The sentiment score 415 of sentiment record 410 is determined by a summation of the total numerical values of emotional or descriptive words within the record, divided by the total number of words. Sentiment record 420 includes the sentence "It was good and bad. The bed was ok." (emphasis added) Processor 120 analyzes this sentence and identifies the positive word "good", the negative word "bad", and the neutral word "ok". Processor 120 further calculates a sum of the emotional words of the record, thus yielding a total of 6, i.e., ((bad=1)+(ok=2)+(good=3)). Processor 120 further divides the total of 6 by the total number of words, i.e., 3 words total, thus yielding 2, i.e., sentiment score 422. In this fashion, each record of unfiltered sentiment records 410 are allocated a sentiment score 415.

Further, descriptive or emotional words are not to be limited to only negative, neutral or positive, but instead a scaling can be used. For example, to analyze records according to finer detail, a scale of 1-100 can be used wherein ranges 1-33 are negative words, 34-66 are neutral words, and 67-100 are positive words. For this example, different words are allocated to different numerical values depending on severity. Any combination of scaling can be assigned to calculate sentiment, however, for purposes of simplicity flow diagram 400 utilizes numerical values of 1, 2 and 3.

Additionally, meta-data can be substituted for the unstructured data terms to yield sentiment score 415. For example, meta-data can include a rating scale used to solicit consumer feedback. Accordingly, the record may be a consumer satisfaction feedback. The sentiment value for each record can be the summation of all the ratings in a particular record, divided by the total potential amount of rating points available. For example, if the record had a 10 point rating scale that was rated at an 8, the sentiment value could be calculated as 80%, i.e., 8/10. Thus, processor 120 can calculate sentiment score 415, via meta-data from other sources instead of processing emotional words.

Unfiltered sentiment records 410 are divided, as discussed above, into two groups of records: January records 425 and February records 430. January records 425 represent the total number of records, i.e., 1,000 records, falling within the month of January, and February records 430 represent the total number of records, i.e., 2,000 records, falling within the month of February.

Each of January records 425 and February records 430 are further processed by processor 120, resulting in a term table similar to FIG. 2. This term table is provided for reference below, and lists each term (or groups of terms) such as term records beds 435, term records $2^{nd}$ term 440, term records $3^{rd}$ term 445, and term records beds 450, term records $2^{nd}$ term 455 and term records $3^{rd}$ term 460. Each record in the group of records has a sentiment score, i.e., sentiments score 422, that is used to determine a sentiment value, i.e., sentiment values 436, 441, 446, 451, 456 and 461.

The sentiment values are a numerical value such as a mean, a variance and a standard deviation, determined according to the number of records having the term and the sentiment score allocated to each record, i.e., sentiment score 415. In particular, for each group of records, e.g., January records 425 and the term records, the sentiment mean is determined by summing each sentiment score within the group divided by the total number of records. For example, a mean sentiment value for January records 425 is calculated by: (the summation of the each sentiment score 415) divided by (the total number of records of the group, N=1,000). Likewise, this determination is to be applied to February records 430.

Another sentiment value is a variance. The variance is determined to measure how far a set of numbers, i.e., the mean calculated according to the sentiment, are spread out, relative to each other. The sentiment variance for a term or combination of terms is indicative of how much stability there is in the manufacture or management of a product or service relating to that particular term or combination of terms. In customer service and quality management practices such as Six Sigma, practiced at companies from Motorola and General Electric to Starwood Hotels, it is commonly believed that one of the best ways to increase quality of a product or service is to decrease variance or standard deviation around that process, product or service.

For example, a large variance in sentiment for specific terms within January records 425 or February records 430 can indicate that a quality process may be out of control. Companies typically want to decrease variance in order to increase quality. If sentiment variance for the term records beds 435 is high, it might indicate that some customers are very pleased with their beds while others are very displeased with their beds. Although a high positive sentiment is typically not a concern, high variance of sentiment is a concern. An analyst would want to better understand why there is such as large span or variance in sentiment in records where the term "beds" is mentioned. The sentiment variance is determined by the following equation:

$$\text{Var}(X)=E[(X-\mu)^2].$$

With a random variable X having the expected value (mean) $\mu=E[X]$,

For example, if the mean, or expected value of the sentiment of the term "beds" within January records 425 was equal to 3.5, and January records 425 contained six (6) records containing the term "beds" with six (6) different sentiment scores of (1, 2, 3, 4, 5, 6) then the variance of sentiment for the term "beds" within January would be calculated as $(2.5^2+1.5^2+0.5^2+0.5^2+1.5^2+2.5^2)/6=17.5/6\approx2.9$ Another sentiment value, i.e., a standard deviation, is calculated from the variance. The sentiment standard deviation provides an indication of distribution of sentiment for a group as a whole. The sentiment standard deviation is calculated for each group of records, i.e., January records 425 and February records 430 (see Term Table 1, below). The sentiment standard deviation is determined by taking the square root of the variance: the standard deviation σ (sigma) is the square root of the variance of X, i.e., it is the square root of the average value of $(X-\mu)2$. In the above example, a term sentiment variance for "beds" of 2.9=1.703.

The resultant determinations of sentiment value are further compiled into a term table, similar to FIG. 2. For example, results from the sentiment value can be compiled into Term Table 1, provided below.

TABLE 1

Term Table according to FIG. 4

| TERM | JAN (%) | FEB (%) | JAN STD. DEVIATION | FEB. STD. DEVIATION. |
|---|---|---|---|---|
| "BEDS" | 1% | 1% | 0.3 | 0.4 |
| 2ND TERM | 2% | 3% | 1.1 | 1.2 |
| 3RD TERM | 10% | 9% | 1.2 | 1.1 |
| ... | ... | ... | ... | ... |
| NTH TERM | | | | |

A test for statistical significance, e.g., a confidence level, provides a vehicle for comparison between groups of records such as January records 425 and February records 430. This confidence level, as discussed prior, accounts for errors associated with data limited to a particular sample size.

For example, 10 records, i.e., n=10, in January contain the term "beds" and have a standard deviation of 4 points, while 8 records in February contain the term "beds" and have a sentiment standard deviation of 5.7. In order to conclude that there is more variation in the sentiment related to the term "beds" in February than in the sentiment for the term "beds in January, at a 95% confidence interval ($\alpha$=0.05) requires the test for statistical significance to account for differing sample sizes.

In order to conclude with the 95% confidence interval that there is more variation in the sentiment related to the term "beds" in February than in January, a null hypothesis is established. The null hypothesis is that the standard deviation of the sentiment of records containing the term "beds" in February is not significantly greater than the standard deviation of the sentiment where the term "beds" is contained in January records. The test statistic for this type of hypothesis testing is:

$$F = \frac{s_1^2}{s_2^2},$$

The critical value $F_c$ in this case 3.29 is found from the F-distribution tables (commonly available in statistics text books). Next, a decision rule is setup. Here $s_1$ ($S_F$) is 5.7 and $n_1$ is 8. Also $s_2$ ($S_J$) is 4 and $n_2$ is 10. By convention, the larger S is put in the denominator. Degrees of freedom (d.f.N) for $S_1$ and $S_2$ are needed in order to find the critical F value in the F tables. These are calculated by $df_1=n_1-1$ and $df_2=n_2-1$. In this case, d.f.N=8−1=7 and d.f.D=10−1=9. If calculated F is less than or equal to critical F, we conclude with 95% confidence that there is no statistically significant difference.

While processor 120, can be set to do a one tailed or two tailed tests, at any confidence level, for this example the variance, specifically standard deviation, of the sentiment for the terms including "beds" in the second group (February) is determined to be higher than the standard deviation of the records containing terms, including "beds" in the first group (January), a one-tailed test using the table for $\alpha$=0.05 to get a critical F Value of $F_c$=3.29. We accept the null hypothesis for F<3.29.

$$F = \frac{s_1^2}{s_2^2}$$

Here, we use $S_F$ for the standard deviation for February and $S_J$ for January, to find $F=S_F^2$, $S_J^2=5.7^2/4^2=2.03$ If the calculated F is less than 3.29, the conclusion is that at a 95% confidence interval ($\alpha$=0.05), the standard deviation of the sentiment in February records containing the term "beds" is not significantly greater than the standard deviation of the sentiment in records containing the term "beds" in January records.

Accordingly, a quality analyst for the hotel can conclude that there is no increase in sentiment variance in regard to "beds" between January and February. Instead, the quality analyst can refer to additional terms, such as term records $2^{nd}$ term 440, 455, $3^{nd}$ term 445, 460 and terms from the term table (discussed above) where the variance or standard deviation is increasing, thereby indicating potential problem areas of customer service. If the variance or standard deviation of sentiment in records containing the term "beds" increased significantly from January records 425 to February records 430, the quality analyst monitoring consumer feedback is alerted to explore the individual records further to understand why there was a larger spread between satisfied and dissatisfied customers in regard to the term "beds". For example, there may be a problem related to some housekeeping staff performing an exceptionally good job, while other housekeeping staff performs a poor job. This is indicative of a failure of implementation of the "best practices" taught to housekeeping staff about "beds" (standard across all properties of the brand). Conversely, a variance decrease from January to February for records containing the term "beds" indicates the positive trend that the housekeeping staff performed based on uniformity in their duties regarding "beds".

Processor 120 performs this analysis for all terms within any group or sub-group. The result of this exhaustive analysis is provided in a resulting table of terms that appearing in either January or February can be sorted by mean sentiment, variance of sentiment, standard deviation of sentiment, alphabetically, by the frequency or rate of occurrence of terms, by each terms mean sentiment, or by the difference in mean sentiment of the terms, i.e. the mean sentiment value for January minus the mean sentiment value for February. The difference in mean sentiment between January and February can be further tested for statistical significance using the statistical significance test discussed prior.

In this manner, a user may quickly sort all terms and determine which term is associated with high positive customer sentiment, i.e., the group of records for a term having a high group sentiment, and which are associated with poor customer sentiment, i.e., the group of records for a term having a low group sentiment. The user can also quickly determine which, if any, terms seem to be problematic, i.e. their sentiment mean is decreasing significantly between January and February, or which terms may be responsible for improvements in customer sentiment (increasing significantly between January and February). Terms not increasing or decreasing significantly may be ignored as 'noise'.

The techniques described herein are exemplary, and should not be construed as implying any particular limitation on the present disclosure. It should be understood that various alternatives, combinations and modifications could be devised by those skilled in the art. For example, steps associated with the processes described herein can be performed in any order, unless otherwise specified or dictated by the steps themselves. The present disclosure is intended to embrace all such alternatives, modifications and variances that fall within the scope of the appended claims.

What is claimed is:

1. A method comprising:
using a computer having a processor, and a memory having computer instructions to cause the processor to perform steps, including:
filtering a plurality of unfiltered records having unstructured data according to at least one criterion into at least a first group and a second group, said first group and said second group each comprise at least two records, wherein said first group is different than said second group, the groups being stored in the memory;
determining a first proportion of occurrence for a term by comparing a first number of records having at least one occurrence of said term in said first group to a first total number of records in said first group;
determining a second proportion of occurrence for said term by comparing a second number of records to determine a number of occurrences of said term in said second group to a second total number of records in said second group;
determining a first standard error range according to said first proportion of occurrence of said term, a first total number of records within said first group, and a level of confidence;
determining a second standard error range according to said second proportion of occurrence of said term, a second total number of records within said second group, and said level of confidence; and
indicating, via an overlap identifier, when said first standard error range and said second error range overlap.

2. The method of claim 1, wherein said plurality of unfiltered records comprise at least 3 records, and wherein at least one record of said first group is different than at least one record of second group.

3. The method of claim 1, wherein said plurality of unfiltered records comprise at least 4 records, and wherein at least two records of said first group are different than at least two records of said second group.

4. The method of claim 1, further comprising
comparing said first proportion of occurrence to said second proportion of occurrence to yield a resultant comparison occurrence.

5. The method of claim 1, wherein said term comprises at least one selected from the group consisting of: an alphanumeric character, a symbol, and any combination thereof.

6. The method of claim 1, wherein said at least one criterion is selected from the group consisting of: a time, a gender, and an age.

7. A non-transitory storage medium comprising:
instructions that are readable by a processor and cause said processor to:
filter a plurality of unfiltered records having unstructured data according to at least one criterion into at least a first group and a second group, said first group and said second group each comprise at least two records, wherein said first group is different than said second group;
determine a first proportion of occurrence for a term by comparing a first number of records having at least one occurrence of said term in said first group to a first total number of records in said first group;
determine a second proportion of occurrence for said term by comparing a second number of records to determine a number of occurrences of said term in said second group to a second total number of records in said second group;
compare said first proportion of occurrence to said second proportion of occurrence to yield a resultant comparison occurrences;
determine a first standard error range according to said first proportion of occurrence of said term, a first total number of records within said first group, and a level of confidence;
determine a second standard error range according to said second proportion of occurrence of said term, a second total number of records within said second group, and said level of confidence; and
indicate, via an overlap identifier, when said first standard error range and said second error range overlap.

8. A method comprising:
using a computer having a processor and a memory having computer instructions to cause the processor to perform steps, including:
allocating each record of a plurality of records a numerical value according to a sentiment to yield a plurality of sentiment records;
filtering said plurality of sentiment records according to a criterion to yield filtered records;
determining a sentiment value for a term according to a number of said filtered records having said term and said numerical value, wherein said sentiment value is selected from the group consisting of: a mean, a variance and a deviation; and
determining a proportion of occurrence of a term by comparing a number of said filtered records having at least one occurrence of said term to a total number of records in said filtered records.

9. The method of claim 8, wherein said filtering further comprises filtering said plurality of sentiment records according to one criterion selected from the group consisting of: said numerical value, a time, a gender, and an age.

10. A non-transitory storage medium comprising:
instructions that are readable by a processor and cause said processor to:
allocate each record of a plurality of records a numerical value according to a sentiment to yield a plurality of sentiment records;
filter said plurality of sentiment records according to a criterion to yield filtered records;
determine a sentiment value for a term according to a number of said filtered records having said term and said numerical value, wherein said sentiment value is selected from the group consisting of: a mean, a variance and a deviation; and determining a proportion of occurrence of a term by comparing a number of said filtered records having at least one occurrence of said term to a total number of records in said filtered records.

\* \* \* \* \*